United States Patent
Turberfield et al.

(12) 
(10) Patent No.: US 6,358,653 B1
(45) Date of Patent: Mar. 19, 2002

(54) PHOTONIC CRYSTAL MATERIALS AND A METHOD OF PREPARATION THEREOF

(75) Inventors: Andrew Jonathan Turberfield, Headington; Robert Gordon Denning, Tootbaldon, both of (GB)

(73) Assignee: Isis Innovation Limited, Oxford (GB)

( * ) Notice: Subject to any disclaimer, the term of this patent is extended or adjusted under 35 U.S.C. 154(b) by 0 days.

(21) Appl. No.: 09/485,824
(22) PCT Filed: Aug. 18, 1998
(86) PCT No.: PCT/GB98/02462
   § 371 Date: Apr. 7, 2000
   § 102(e) Date: Apr. 7, 2000
(87) PCT Pub. No.: WO99/09439
   PCT Pub. Date: Feb. 25, 1999

(30) Foreign Application Priority Data

Aug. 18, 1997 (GB) ............................... 9717407

(51) Int. Cl.$^7$ .................................. G02B 6/12
(52) U.S. Cl. ............................ 430/18; 430/290; 430/1; 430/2
(58) Field of Search ............... 430/1, 2, 290, 430/18

(56) References Cited

U.S. PATENT DOCUMENTS 5,600,483 A 2/1997 Fan et al. .................... 359/344

FOREIGN PATENT DOCUMENTS

DE 196 28 355 A1 3/1997
EP 0 624 558 A2 11/1994

OTHER PUBLICATIONS

Berger et al, "Photonic band gaps and holography" *JOURNAL OF APPLIED PHYSICS*, Jul. 1, 1997, AIP, USA, vol. 82, No. 1, pp. 60–64.

Bing–Ying C et al, "Crystallization of Dielectric Spheres in Laser–Standing Wave Field", *ACTA PHYSICA SINICA*, vol. 3, No. 11, Nov. 1994, pp. 861–869.

Dongbin Mei et al, "Three dimensional ordered patterns by light interference", *OPTICS LETTERS*, 1 Mach 1995, USA vol. 20, No. 5, pp. 429–431.

Berger et al Electronic Letters Feb. 27, 1997, vol. 33, No. 5. pp. 425–426. "Fabricaiton of a 2D photonic bandgap by a holographic method".

*Primary Examiner*—Cynthia Hamilton
(74) *Attorney, Agent, or Firm*—Nixon & Vanderhye

(57) ABSTRACT

The photonic crystal material has a 3-D periodic structure with a periodicity that varies on a length scale comparable to the wavelength of electromagnetic radiation. The 3-D periodic structure is produced by irradiating photosensitive material with electromagnetic radiation such that interference between radiation propagating in different directions within the sample gives rise to a 3-D periodic variation in intensity within the sample. Thereafter the irradiated material is developed to remove the less or more irradiated regions of the material to produce a structure having 3-D periodicity in the refractive index of the composite material. 3-D photonic material is particularly suited to use as low-loss waveguides and as a control with lasers to limit the number of modes into which a laser may emit radiation.

20 Claims, 5 Drawing Sheets

PHOTONIC CRYSTAL MATERIALS AND A METHOD OF PREPARATION THEREOF

The present invention relates to photonic crystal materials (also known as photonic bandgap materials) and a method of preparation thereof. In general a photonic crystal is a composite dielectric medium having a structure which varies periodically on a length scale comparable to the wavelength of electromagnetic radiation. In an ideal photonic crystal multiple scattering and interference of electromagnetic waves propagating through the medium results in forbidden frequency bands for a given direction of propagation within which no propagating electromagnetic modes exist. Within a forbidden band the material is highly reflective and inside the medium emission of radiation having frequencies in the forbidden band is suppressed. A photonic crystal structure may be employed to modify the interaction of a material with electromagnetic radiation, including for the purpose of controlling the appearance of the surface of the material, and in the construction of optical and opto-electronic devices (not restricted to visible optical frequencies).

In U.S. Pat. No. 5,385,114 a method of preparing a photonic crystal is described in which the pores of a reticulated mesh are impregnated with a suitable liquid dielectric material which is then solidified. In order to introduce the dielectric material, the material of the mesh must have a much higher melting point than the dielectric material and so, for example, the material of the mesh is a metal. Thereafter, the mesh is dissolved using a suitable liquid chemical reactant to leave a porous dielectric material. The pores of the dielectric material have a different refractive index to the material itself, so a periodic structure made in this way would enable the material to function as a photonic crystal. After the reticulated mesh has been removed, the pores in the dielectric material may be filled with a separate material that has a refractive index different to the refractive index of the dielectric material. In this document the method of pore filling is demonstrated using a random rather than a periodic metallic mesh but it is envisaged that a periodic metal mesh could be formed by freezing electro-hydrodynamically generated metal droplets, by weaving a mesh of wires, by assembling small pieces or, by inference from the preamble, by drilling or reactive ion etching a slab of metal through a mask.

In order for the photonic crystal to be useful, the periodicity of the dielectric material must be of size comparable to the electromagnetic wavelength of interest. On a scale comparable to visible optical or near-infrared wavelengths only the etching procedures are practicable. However, fabrication of masks suitable for use in such drilling or ion etching operations is extremely difficult and costly. Such techniques currently cannot provide the necessary resolution or drilling depth to produce photonic crystals for use at visible optical wavelengths.

The present invention seeks to provide a novel photonic crystal material and a method of preparing the same, having a three-dimensional periodicity with a length scale comparable to infra-red, visible, optical or shorter electromagnetic wavelengths, which overcomes the disadvantages of the known procedures described above. Reference to three dimensional periodicity is intended as reference to periodic variation of a characteristic in all three dimensions of the material. Reference to periodicity or periodic variations should be taken to include the cases in which the variation is substantially periodic and cases in which two or more periodic patterns, with unit cells which may not be commensurable, are superimposed. Reference to the length scale of a periodic variation is intended to refer to a characteristic dimension of a Wigner-Seitz primitive unit cell.

The present invention provides a method of forming a photonic crystal material comprising irradiating a sample of photosensitive material with electromagnetic radiation such that interference between radiation propagating in different directions within the sample gives rise to a three dimensional periodic variation of the intensity of irradiation within the sample whereby the periodic variation in intensity produces a corresponding periodic variation in the refractive index of the photosensitive material.

Ideally, the irradiated sample of photosensitive material is developed to remove either more irradiated or less irradiated regions of the sample.

To maintain the three dimensional periodicity within the sample, the intensity interference pattern is not substantially perturbed by photoinduced changes in the refractive index of the sample material. The sample of photosensitive material may be subjected to multiple exposures each producing respective interference patterns within the sample.

The sample of photosensitive material may be irradiated with a coherent or partially coherent source of electromagnetic radiation. Material may be introduced into the voids in the composite material or the composite material may be used as a template for the production of other composite materials having periodic variations in refractive index. By both of these techniques the optical properties of the photonic crystal material may be altered and the frequency ranges of the forbidden photonic band gaps adjusted. In particular, by selection of a material having an appropriate refractive index, the overlap between forbidden frequency bands corresponding to different directions of propagation of radiation may be increased to create or to widen a complete photonic band gap, i.e. a range of frequencies for which no propagating electromagnetic modes exist in any direction.

Preferably, the three dimensional pattern within the sample is formed by directing electromagnetic radiation from at least four coherent or partially coherent beams or sources at the sample of photosensitive material so as to intersect and interfere within the sample. Additionally, the sample may be irradiated more than once to generate a plurality of three dimensional patterns in the sample.

With the present invention the length scale of the periodicity within the sample of photosensitive material is dependent on the length scale of the periodicity of the interference pattern which in turn is dependent on the frequency of the incident radiation, on the refractive index of the photosensitive material and on the shape and direction of propagation of the interfering electromagnetic wavefronts within the sample. Three-dimensional periodicity with a submicron length scale can be produced in the sample without the need for expensive masks making the invention particularly suitable for the production of photonic crystal material for use in optical and electro-optical applications in the infra-red, visible optical or shorter wavelength regions of the electromagnetic spectrum.

Moreover, with the present invention a photonic crystal material is provided that has three dimensional periodicity of its refractive index for a thickness for at least 10 microns and more preferably at least 50 microns.

For a better understanding of the present invention, embodiments of the present invention will now be described, by way of example only with reference to the accompanying drawings, in which.

If a photosensitive material is simultaneously exposed to electromagnetic radiation from a plurality of coherent or partially coherent sources, an interference pattern is generated within the photosensitive material and the intensity of the irradiation or dose within the material, which is determined by the interference pattern, varies periodically. Irradiation of the photosensitive material produces changes in the refractive index of the material. In this way by generating an interference pattern of the incident radiation within the sample material a corresponding pattern of variations in refractive index is produced. The changes in refractive index produced by irradiation are small and so to increase the difference in refractive index between regions of high radiation intensity exposure and low radiation intensity exposure within the irradiated sample, the irradiated sample is preferably developed using conventional chemical processes. During development of the irradiated material regions of the material which correspond approximately to those that have absorbed less than or more than a critical dose of radiation are dissolved away. After development a periodic structure remains consisting of residual material and voids (which may be filled with other material, for example air or a solvent having a different refractive index).

A three dimensional structure can be obtained by use of at least four interfering beams of substantially collimated and monochromatic electromagnetic radiation with differences between the individual wavevectors of each beam determining reciprocal lattice vectors and thus the symmetry of the resultant periodic structure.

Figure 1:
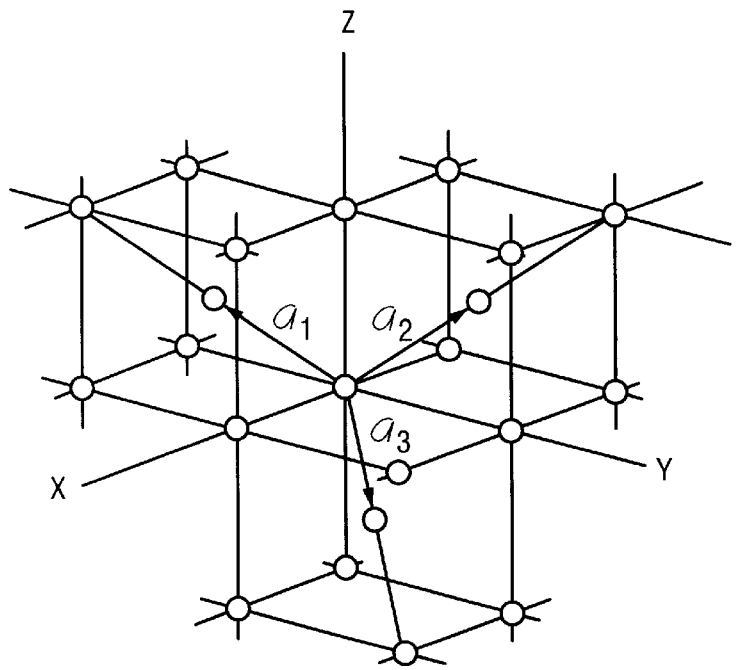
FIG. 1 is a diagram of a body-centred cubic (bcc) reciprocal lattice of a face-centred cubic (fcc) structure.

To assist in an understanding of the relationship between the wavevectors of the beams and the translational symmetry of the resultant interference pattern, the following is an explanation of the manner in which one particular set of suitable wavevectors are determined for a periodic structure having face centred cubic (fcc) symmetry. FIG. 1 shows a body centred cubic (bcc) reciprocal lattice of a fcc structure with $a_1=(2\pi/d)(-1,1,1)$, $a_2=(2\pi/d)(1,-1,1)$ and $a_3=(2\pi/d)(1,1,-1)$ as a set of primitive reciprocal lattice vectors, in which d is the side of the fcc cubic unit cell. One of the incident beams is defined to have the reference wavevector $k_0=2\pi/d(3/2,3/2,3/2)$ and the wavevectors for the other three beams are then given by $k_1=k_0-a_1$, $k_2=k_0-a_2$ and $k_3=k_0-a_3$. Differences between these wavevectors join lattice points in the bcc reciprocal lattice. Interference of radiation with these four wavevectors will generate an interference pattern with fcc symmetry.

Figure 2:
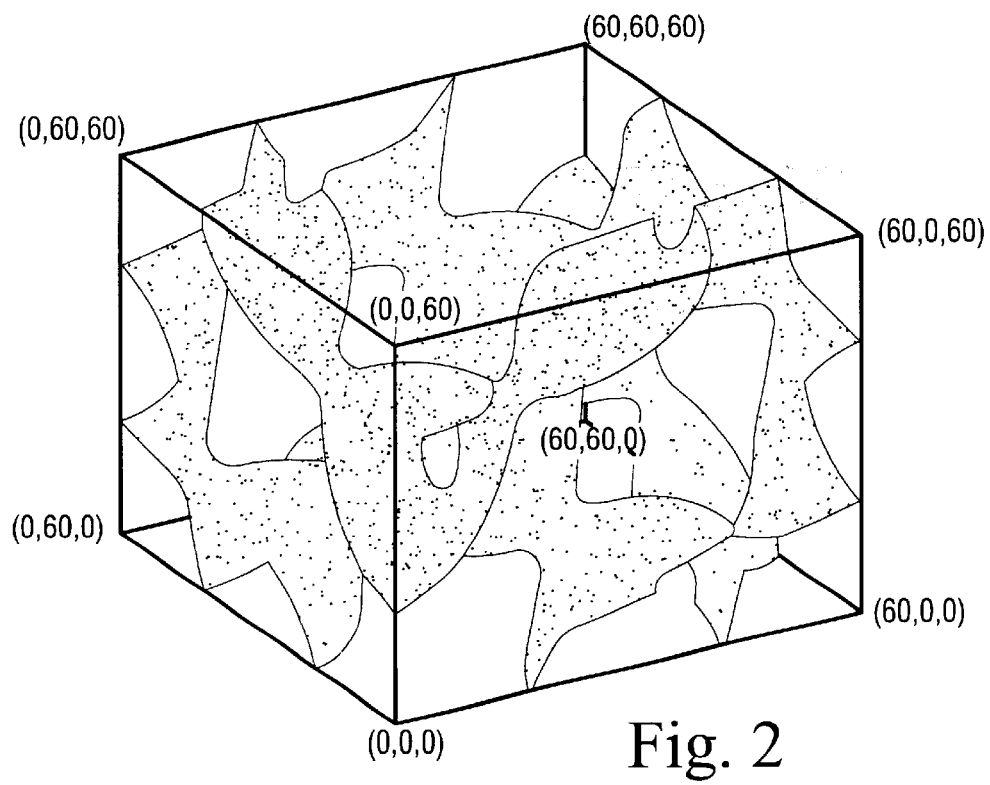
FIG. 2 is a diagram of the threshold intensity contours resulting from a single irradiation by four intersecting beams.
Figure 3:
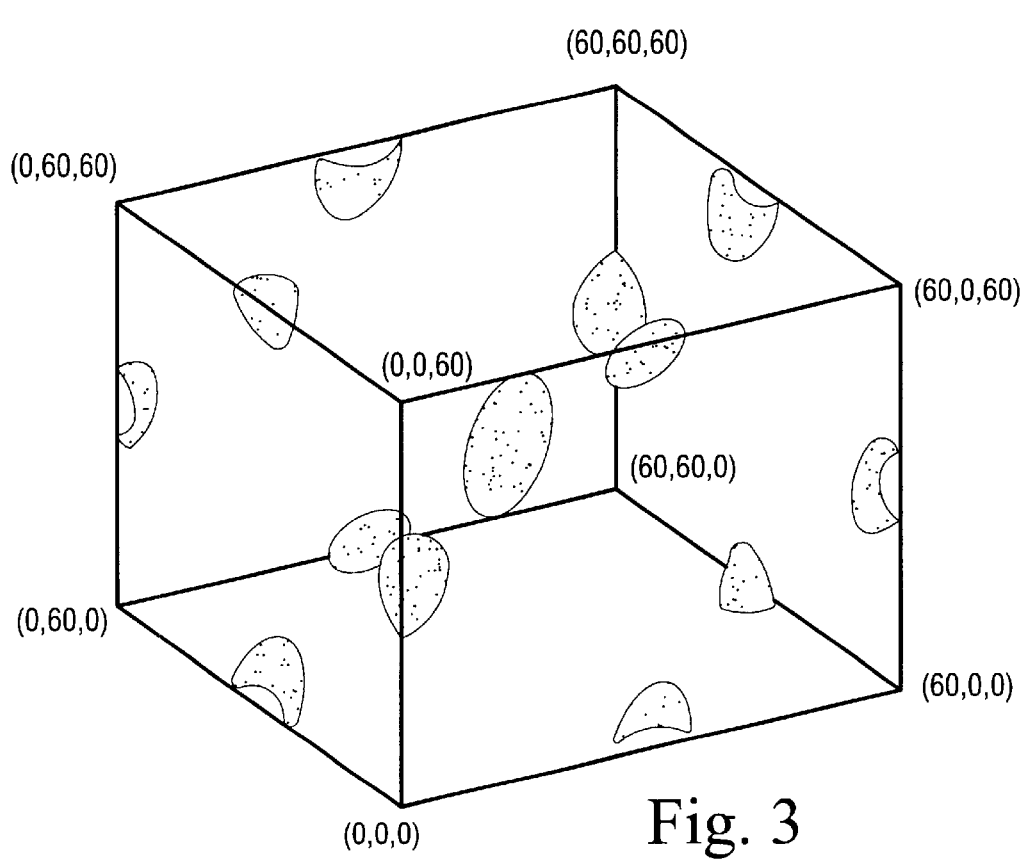
FIG. 3 is a diagram of the same interference pattern as for FIG. 2 but with a higher threshold intensity contour.

The following is an example of a method of producing a photonic crystal material having three dimensional periodicity. A negative photoresist, whose solubility in an appropriate solvent is decreased after exposure to radiation with a wavelength of 355 nm, is simultaneously irradiated by four laser beams at a wavelength of 355 nm from a frequency-tripled Nd:YAG laser, having the wavevectors described above, which intersect within a layer of the photoresist. The interference of the four beams generates a three dimensional periodic intensity modulation within the photoresist having fcc structural symmetry with a cubic unit cell size of approximately 0.6 $\mu$m. FIG. 2 is a diagram of a resultant contour of constant intensity with FIG. 3 showing a higher intensity contour within the same interference pattern. After development of the polymer, which results in removal of less-irradiated regions of the material, a three dimensional periodic structure consisting of interpenetrating networks of irradiated photoresist and of air- or solvent-filled voids is formed.

Although the intensity of radiation in any interference pattern generally changes slowly on the length scale of the wavelength, the resulting structures shown in the accompanying Figures have relatively sharply defined surfaces. This is achieved as a result of non-linearity in the photochemical reactions and subsequent development that produce a threshold dividing soluble and insoluble material. This threshold may correspond approximately to a contour of constant irradiation dose. Through appropriate selection of the threshold intensity, the fraction of material removed from the sample may be controlled.

For any three dimensional structure produced by the method described above or any other method employing the formation of 3-D interference patterns in the sample material, it is important that the interference pattern is such that the material to be removed during development forms a connected network. This ensures that such material can be removed from the residual material to produce voids. In addition, the interconnection of the voids enables a material having a different refractive index with respect to the photosensitive material or other desirable properties to be introduced into the voids. It is also important that removing material from the voids does not destroy the periodic structure of the residual material: for example this may be achieved by ensuring that the interference pattern is such that the material to be removed and the material to be retained during development both form continuous interpenetrating networks. This condition is satisfied in the example given above where the surface dividing material that is removed and residual material that is retained during development corresponds approximately to the contour of constant irradiation shown in FIG. 2.

Unlike the situation described above, to ensure that the periodic structure of residual material in a disconnected network is not destroyed during development, the residual material may include a permanent support structure. For example, a continuous secondary network of material that permeates the photosensitive material before exposure and is not destroyed by exposure or development can support the residual material. An example of such a secondary network is a silica gel. Alternatively, the residual material may form a three dimensional periodic structure after development if isolated particles of the residual material are compacted together, without destroying three-dimensional periodicity, to form a continuously connected material with a smaller unit cell than the original interference pattern.

In the above example a single exposure using four simultaneously intersecting laser beams is employed.

However, this can provide only a restricted class of continuously connected three dimensional structures. Greater flexibility is achieved using a double or multiple exposure technique that gives more control of the spatial distribution of the irradiation dose within the photosensitive material. In the double exposure technique the photosensitive material is exposed twice; each exposure is such that the irradiation dose due to each exposure varies periodically with position in the photosensitive material as described above. Radiation which is considered to form part of one exposure may be present in the sample at the same time as radiation considered to form part of the other; the characteristic of a double exposure, and the criterion used to assign radiation energy to one or other exposure, is that the effect of interference between radiation from different exposures in determining the spatial variation of the total irradiation dose is reduced or eliminated with respect to the effect of interference between radiation from different sources belonging to the same exposure. This is achieved either by ensuring that the degree of coherence between radiation from the two exposures is less than the degree of coherence between radiation from different sources belonging to the same exposure or by reducing the overlap in time between the two exposures.

Thus, using the double exposure technique, radiation in the first and second exposures can be derived from mutually incoherent sources, which may be for example the output of a laser at different times, different lasers, or sources with different frequencies.

With an alternative method employing the double exposure technique, two pulses of electromagnetic radiation are used in which interference between the two pulses is reduced or eliminated by ensuring that the second pulse arrives later than the first. For example, a single laser pulse is split into two pulses the second delayed in time relative to the first. The first pulse is split into four beams that are used to create an initial three dimensional interference pattern in the photosensitive material. After the first pulse has decayed, during which time the second pulse has followed a delay line, the second pulse is similarly split into four beams which follow different paths from the four beams in the first exposure and overlap to form a different three dimensional interference pattern in the photosensitive material. Alternatively, the beams derived from the second pulse may follow substantially the same paths as the first four beams but are subject to differing relative phase delays with respect to the relative phase delays of the beams from the first pulse so that a interference pattern is formed that is similar or identical to the initial interference pattern but which is shifted in spatial position relative to the initial pattern. To generate the necessary relative phase delays electro-optic phase modulators are provided on at least one of the four beam lines and are adjusted in the time interval between the first and second pulses. If a pulse from a frequency-tripled Nd:YAG laser of duration approximately 5 ns is used, then a delay line of a few metres length gives enough delay to avoid overlap in time between the two exposures and to allow the phase modulators to change state between pulses.

Figure 4:
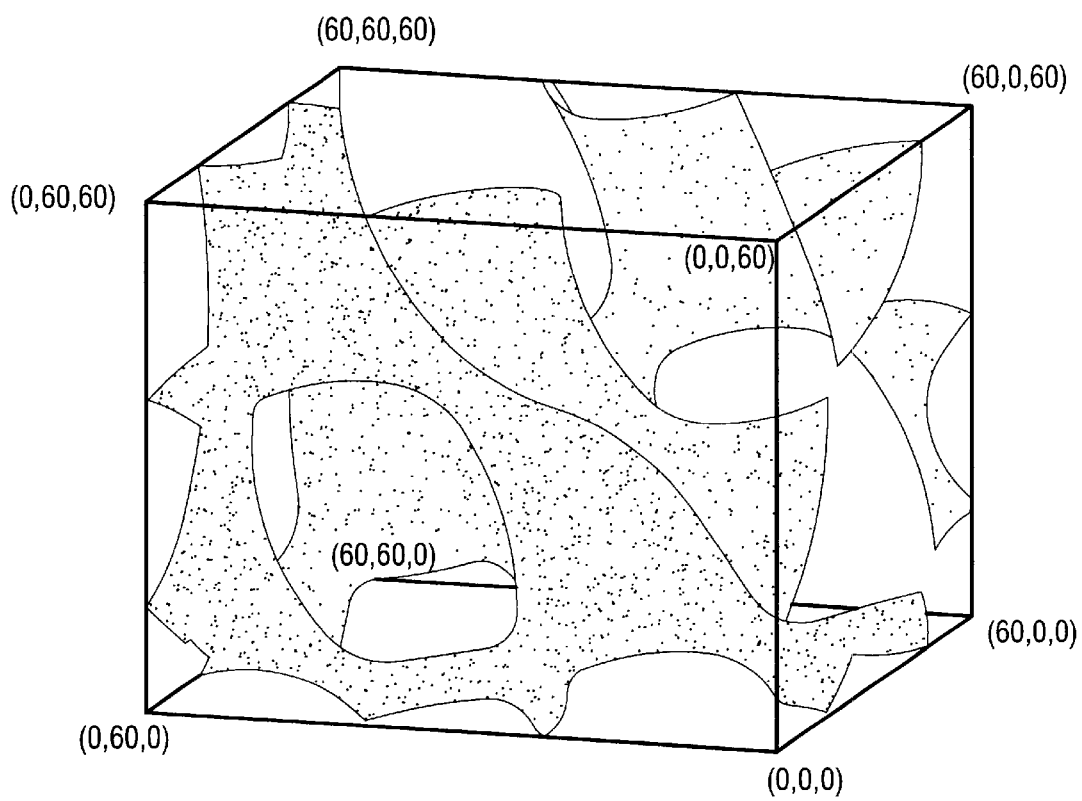
FIG. 4 is a diagram of the threshold intensity contours for a double pulse exposure using different beam wavevectors to those of FIGS. 2 and 3.

Using any of the methods described above which employ the double exposure technique, the photosensitive material is subsequently developed, using conventional techniques, in the same manner as described previously. The double exposure technique enables the shape of a contour of constant dose within the photosensitive material to be accurately controlled which increases the ease of the design and fabrication of open yet continuously connected structures. FIG. 4 is a diagram of an intensity contour, having fcc symmetry, produced using a double-pulse exposure with wavevectors different to those set out above and so having a smaller unit cell dimension of approximately 0.3 $\mu$m. The intensity contours shown in FIG. 4 reveal a structure having very fine bonds and a low volume filling fraction.

As mentioned earlier, the photosensitive material may be irradiated with more than two exposures. As long as substantial photochemical changes do not occur in the total time during which irradiation takes place, it is possible to ensure that all exposures produce periodic intensity patterns with the same periodicity or commensurable periodicities. In the case where successive exposures correspond to irradiation with laser beams following the same paths, the relative phase delay between the beams is altered between each pulse from the source; this enables three or more exposures of the material to be performed with each one producing an interference pattern spatially shifted with respect to the other interference patterns.

For many suitable photosensitive materials the duration of the exposure of the photosensitive material to electromagnetic radiation must be short enough that the intensity interference pattern is not significantly perturbed by photo-induced changes in the refractive index of the photosensitive material. Short pulse exposure reduces the constraints on the mechanical stability of the optical components. To ensure that the intensity interference pattern formed in the sample material is not significantly affected by changes in refractive index induced by irradiation, ideally the sample material should not be subjected to irradiation for more than 100 ms. With other photosensitive materials, major photoinduced changes in refractive index do not occur during exposure but during subsequent procedures, for example heating of the sample.

Figure 7:
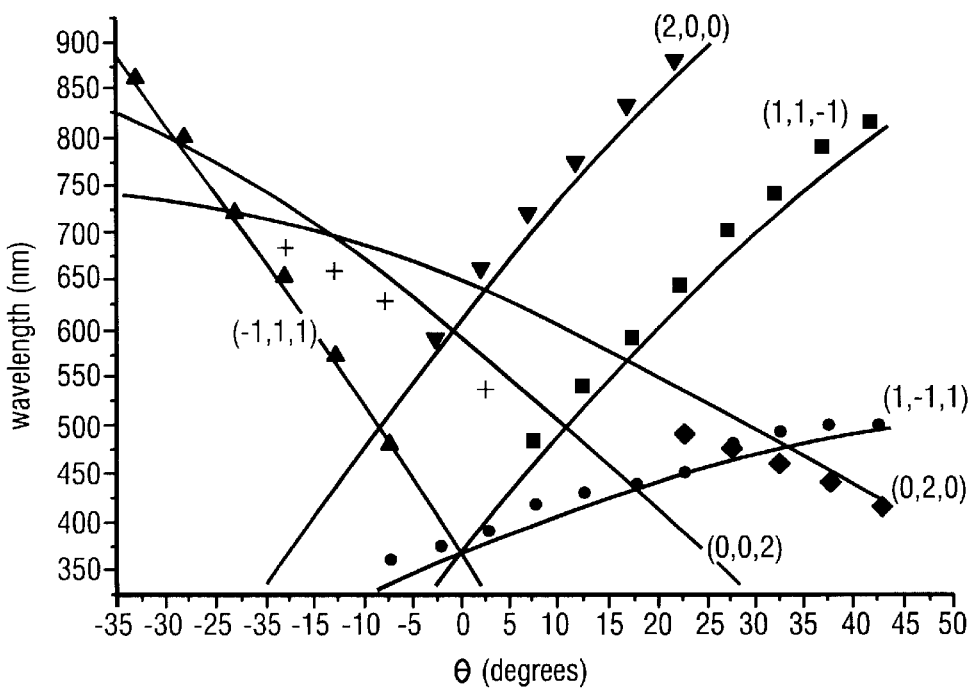
FIG. 7 is a graphical representation of Bragg diffraction from a sample, irradiated using the method of the present invention, showing reflections from a 3-D fcc periodic structure.

Using the method described above photosensitive material was irradiated with a single exposure from an injection-seeded, frequency-tripled Nd:YAG laser. The resultant 3-d periodic variations in samples of photosensitive material are shown in FIGS. 5, 6 and 7. In each case the single exposure lasted for approximately 6 ns and was selected using a mechanical shutter. The laser beam was split into four beams using three beam splitters and each beam was passed through a half wave plate and polariser to control the linear polarisation state and intensity of each of the beams. The diameter of each beam was approximately 8 mm and the four beams interfered in a sample of photosensitive material to produce a fcc periodic pattern (refraction at the air/sample interface means that the structure is not cubic but somewhat foreshortened in the direction perpendicular to this interface). The sample film was oriented in the (1,1,1) plane and the beam directions of propagation were as follows:

| Beam | Direction of Propagation | Polarisation | Relative Pulse Energy |
|---|---|---|---|
| 1 | [1,1,1] | [−1,0,1] | 5 |
| 2 | [1,1,5] | [5,5,−2] | 1 |
| 3 | [1,5,1] | [−1,0,1] | 1 |
| 4 | [5,1,1] | [1,2,−7] | 1 |

Figure 5A:
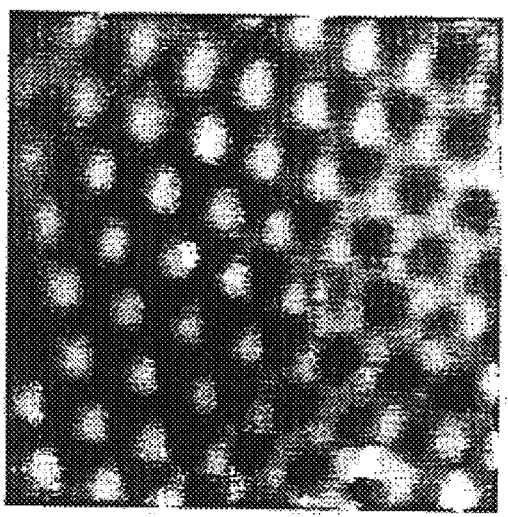
FIGS. 5a and 5b are atomic force microscopy pictures of the top and bottom of a sample, irradiated using the method of the present invention, showing the coherence of a 3-D fcc optical pattern.
Figure 5B:
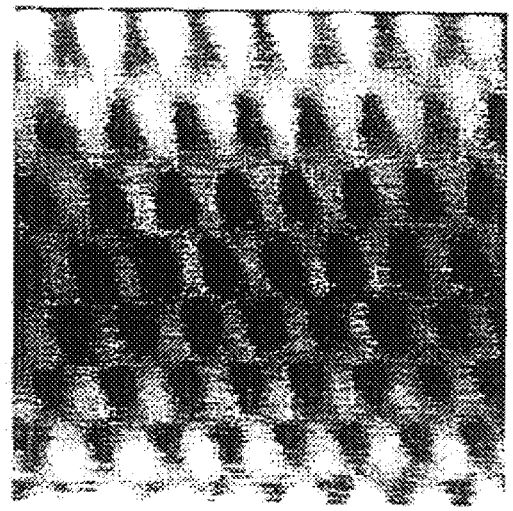

FIGS. 5a and 5b are atomic force microscopy images, at 6×6 micron, of the top and bottom surfaces respectively of a photosensitive material after irradiation as described above. The periodic structure is immediately visible from the images and the fact that the periodic structure is found on both the top and bottom surfaces is evidence of the coherence of the 3-D fcc optical pattern through the thickness of the sample material. In this experiment the sample material consisted of 80 parts by weight of Actilane™ 270

(a difunctional urethane acrylate oligomer supplied by Akros Chemicals); 20 parts by weight of PETA (pentaerythritol triacrylate); and 20 parts by weight of DMPA (2,2-dimethoxy-2-phenyl acetophenone, a photoinitiator also known as Irgacure™ 651). The sample material was spread in a 50 micron layer using a K-bar spreader. The laser energy was 286 mJ with pulse energies 50:10:10:10 mJ. After irradiation the sample material was developed by agitating the sample material in acetone for approximately 10 mins.

Figure 6A:
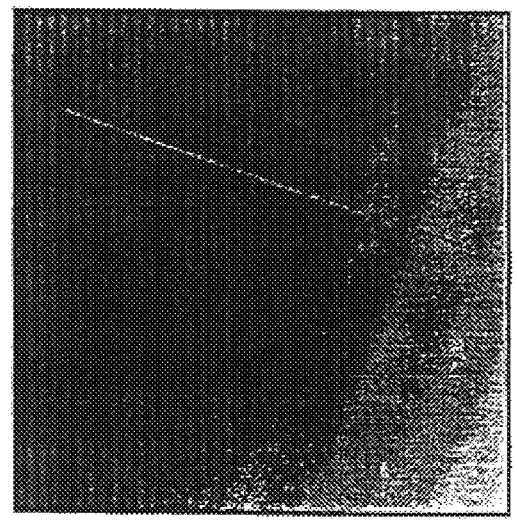
FIG. 6a is an atomic force microscopy picture of the cross-section of a cleaved sample, irradiated using the method of the present invention, showing fractures along terraces in the sample.
Figure 6B:
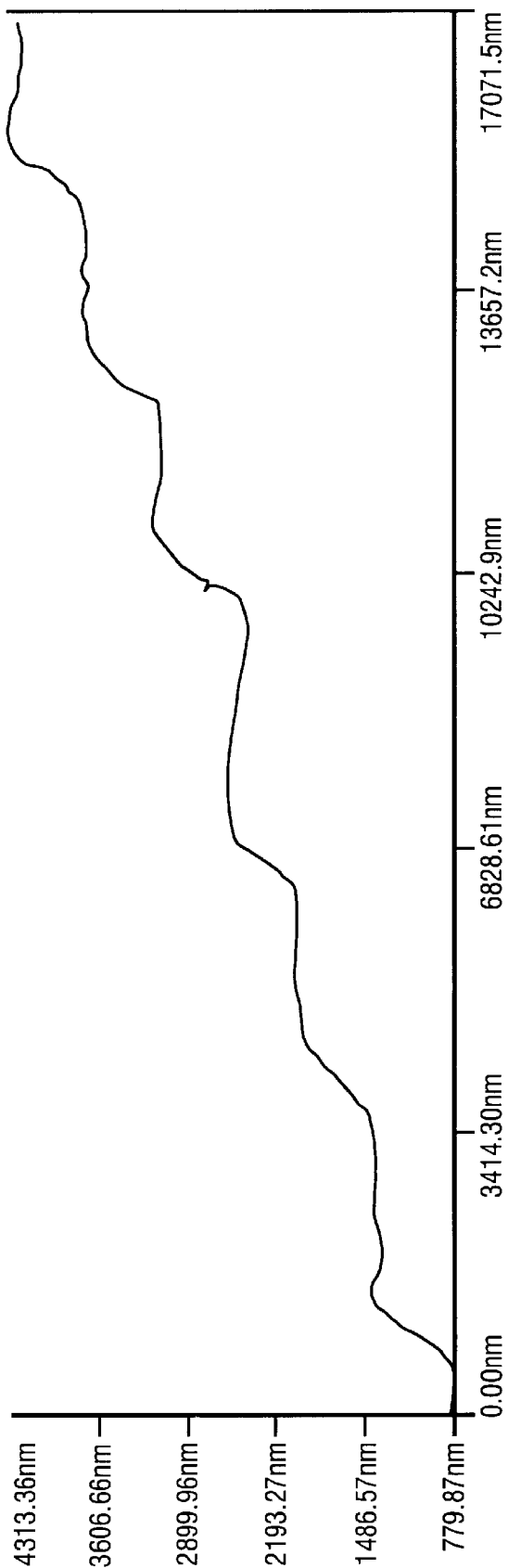
FIG. 6b is a graphical representation of the cleaved sample of FIG. 6a, showing the dimensions of the terraces through part of the sample.

For FIG. 6a the sample material consisted of 60 parts by weight of Actilane™ 320 (a difunctional epoxy acrylate oligomer supplied by Akros Chemicals) 40 parts by weight of PETA and 2 parts by weight of DMPA. In this experiment the sample material was spread in a 100 micron layer on a fused silica substrate again using a K-bar spreader. The laser energy was 300 mJ with pulse energies 65:13:13:13 mJ. After irradiation the sample material was developed for approximately 30 mins in a sonic bath with acetone. To cleave the sample, the sample was cooled in liquid nitrogen and then snapped (not cut) to produce a cleaved plane clearly showing the terraces of the periodic structure in the irradiated sample. The atomic force microscopy image shown in FIG. 6a is a 20×20 micron scan of the film edge after breaking. The presence of the terracing in the sample material further confirms the continuation of the periodic structure through the body of the sample material and the true 3-D nature of the periodic variation of refractive index in the photosensitive material after irradiation. In FIG. 6b the dimensions of the cleaved edge are shown graphically. The step height is approximately 700 nm which is equal to the dimension of one unit cell of the optically created pattern.

In FIG. 7 the Bragg diffraction pattern obtained from a third sample of photosensitive material is shown. In this case the sample material consisted of 50 parts by weight of Actilane™ 270, 50 parts by weight of PETA and 2 parts by weight of DMPA. The sample material was spread in a 50 micron layer using a K-bar spreader over a fused silica substrate. In this case the laser energy was 286 mJ with pulse energies 50:10:10:10 mJ and development of the sample material after irradiation was agitation in acetone for approximately 10 mins. To produce the experimental results shown in FIG. 7 the 3-D microstructured photonic crystal material was rotated about an axis making an angle of approximately 15° with the [1,0,−1] direction in the (1,1,1) plane of the fcc structure. A collimated beam of white light was incident on the photonic crystal material perpendicular to this axis; θ=0° corresponds to incidence along the [1,1,1] direction. The points plotted show wavelengths at which strong Bragg scattering from the periodic structure leads to a minima in the transmitted intensity of the undeviated beam (measured by a spectrophotometer). The solid lines correspond to a calculation of the angular dependence of the wavelengths satisfying the Bragg scattering condition for various crystal planes.

The experimental results described above with reference to FIGS. 5, 6 and 7 show clearly how with the present method, 3-D periodic variations in refractive index in the form of 3-D periodic structures extending though the entire depth of the sample material can be produced.

The above methods may also be used to create photonic crystal structures incorporating intended defects. Such defects are useful either in the form of structural defects or through the introduction of isolated foreign matter, possibly having non-linear optical properties. Defects may be used to create and control electromagnetic modes within the photonic crystal material for the purposes of creating waveguides or microcavities. Microcavities, in which emission of radiation is channelled into a small number of modes, may be used to control the direction of emission and increase the spectral brightness of radiation sources such as light emitting diodes. Microcavities may also be used to create lasers with low or zero threshold densities of electrical or optical pumping. Other optical or electro-optical devices incorporating defects in a photonic crystal material are also envisaged.

Reference has been made in the above description generally to photosensitive materials. Suitable materials for use in the above methods are acrylate negative photoresists; many analogous systems are also possible. Polyacrylates are transparent at 355 nm; polymerisation is induced by conventional radical photoinitiators and proceeds in the dark following a pulsed exposure using radiation from a frequency tripled Nd:YAG laser with wavelength 355 mn. Material with a high density of photochemically induced cross-linking is rendered relatively insoluble and is retained during development. A suitable concentration of a radical inhibitor may be used to alter the threshold between insoluble irradiated regions and soluble regions or to increase the sharpness of this threshold. The major chemical change due to polymerisation occurs with an induction period of several milliseconds, well after the exposure is complete. Hence, the duration of irradiation of the photosensitive material is preferably less than 1 millisecond, and ideally less than 100 ns. Photochemically induced changes in refractive index will therefore not significantly affect a three-dimensional intensity pattern produced by the overlap of beams produced from a single pulse from a typical Nd:YAG laser with a pulse duration of approximately 6 ns, the only significant chemical change which is likely to occur during such a laser pulse is the dissociation of the photoinitiator species. A 100 mJ optical pulse can be used to polymerise a 1 $cm^2$ film and to produce a periodic intensity variation that is approximately independent of depth through a 100 $\mu$m thickness film. It is believed that defects in the periodic structure as a result of crystal defects, volume changes through heat dissipation and strain will not significantly affect the ability of the material to act as a photonic crystal using the above described method.

An alternative materials system is a positive photoresist based on a copolymer of p-hydroxystyrene and t-butylacrylate. Absorption of ultraviolet light by a photoacid generator initiates a reaction in which the photoacid generator catalyses the deprotection of the t-butyl ester to give a carboxylic acid. When heated to 140° C. ('post-exposure baking') approximately 200 carboxylic acid residues are created for each photon absorbed and the polymer becomes soluble in aqueous alkali. No swelling occurs and in conventional photolithography line resolutions of <250 mn can be routinely achieved. In this positive system it is the more-irradiated material that is removed by dissolution and the less-irradiated material that is retained to form a photonic crystal structure. Substantial changes in the refractive index of the sample will not occur until the post-exposure bake relaxing the condition that the sample material should not be subjected to irradiation for more than 100 ms.

Whilst the examples and methods described above can be used to directly produce photonic crystal material. The material produced by this method may also be used as a template for further fabrication steps to produce a photonic crystal material having a different refractive index to that of the sample material. As mentioned earlier, a material may be introduced into the voids between the residual material produced during the initial lithographic technique. Solid material may be introduced either by solidification from a melt, or by chemical vapour deposition, or by electro-plating, electro-deposition, chemical deposition or precipitation from solution, or by sedimentation or other techniques. The original developed material may then be removed using conventional techniques to create a negative of the original lattice. Further iteration of these steps can be performed as necessary to obtain a lattice of material having the desired refractive index with the correct structure. It is believed that the refractive indexes of the photosensitive materials suitable for use with the methods described above are not capable of producing a photonic crystal material having a complete photonic band gap, i.e. a frequency range that is forbidden for all directions of propagation. Therefore, the initial photonic crystal material produced by the above described methods will need to be used as a template in the manner outlined above to produce photonic crystal material having the desired refractive index.

Although in the detailed examples reference was made to coherent radiation sources, the method may alternatively employ partially coherent sources such as a discharge lamp. Also, although most applications of the method described above use a single laser source it is envisaged that multiple laser sources may be used. The radiation used in the method described above having a wavelength of 355 nm is in the ultraviolet spectral range, alternative wavelengths of electromagnetic radiation may be employed with both longer and shorter wavelengths where appropriate.

Although not mentioned above, it is envisaged that with a single source the beam of radiation is divided using partially reflective mirrors to split the radiation by amplitude or by using optical components that reflect, diffract, refract or otherwise affect different parts of the wavefront from the source in different ways (division of amplitude). In addition, using the above method it is possible to fabricate three dimensional structures using more than four intersecting beams, and using radiation other than in the form of collimated beams.

With the methods and examples described above, photonic crystals can be fabricated having a three dimensional periodic structure. Such structures are useful as low-loss waveguides with tight curvature for on-chip signal routing. Also, by using the photonic crystal emission wavelengths can be controlled and the spectral brightness of light-emitting diodes improved. The photonic crystal may additionally be used to limit the number of modes into which a laser may emit radiation thereby lowering the threshold current of the laser and the characteristic of photonic crystal to suppress spontaneous emission in a certain frequency band can be used to enhance photon number state squeezing which offers a reduction in bit-error rate in optical transmission. Further applications of the photonic crystal produced in accordance with the described methods are envisaged for aesthetic as well as technical purposes.

What is claimed is:

1. A method of forming a photonic crystal material comprising irradiating a sample of photosensitive material with electromagnetic radiation propagating in different directions within the sample to generate a three dimensional periodic variation of the intensity of irradiation within the sample by interference between the electromagnetic radiation propagating in the different directions selectively controlling the relative intensity of the electromagnetic radiation propagating in the different directions, selectively controlling the polarization of the electromagnetic radiation propagating in the different directions, and developing the irradiated sample of photosensitive material to remove regions of the sample in dependency upon their irradiation, said regions forming a connected network, to produce a structure having a three dimensional periodic variation in refractive index based on the periodic variation of the intensity of irradiation.

2. A method as claimed in claim 1 wherein material is introduced into voids produced by development of the irradiated sample of photosensitive material.

3. A method as claimed in claim 2, wherein the optical properties of the irradiated sample are adjusted by the introduction of a material having a predetermined refractive index that is different to the refractive index of the photosensitive material remaining in the irradiated sample.

4. A method as claimed in claim 2, wherein the irradiated sample is used as a template for the production of other composite materials having periodic variations in refractive index.

5. A method as claimed in claim 1, further comprising repeating the steps of irradiating the sample with the electromagnetic radiation of controlled intensity and polarization thereby to subject the sample to multiple exposures, each exposure producing respective interference patterns with the sample.

6. A method as claimed in claim 5, wherein the sample of photosensitive material is irradiated with pulsed coherent electromagnetic radiation.

7. A method as claimed in claim 1, wherein the photosensitive material is irradiated for less than 100 milliseconds.

8. A method as claimed in claim 7, wherein the photosensitive material is irradiated for less than 100 nanoseconds.

9. A method as claimed in claim 1, wherein the electromagnetic radiation is controlled to maintain coherence between the electromagnetic radiation propagating in different directions.

10. A method as claimed in claim 1, wherein the three dimensional pattern within the sample is formed by directing electromagnetic radiation from at least four beams at the sample of photosensitive material so as to intersect and interfere within the sample.

11. A method as claimed in claim 1, wherein the frequency of the incident radiation is selected in dependence on the desired length scale of the periodicity within the irradiated sample.

12. A photonic crystal material manufactured by the method as claimed in claim 1.

13. A photonic crystal material as claimed in claim 12, wherein the photosensitive material is selected from the group comprising positive resists and negative resists.

14. A photonic crystal material as claimed in claim 13, wherein the photosensitive material includes a radical inhibitor.

15. A photonic crystal material as claimed in claim 13, wherein the material has 3-D periodicity of its refractive index through a thickness of at least 10 micron.

16. A photonic crystal material as claimed in claim 15, wherein the material has 3-D periodicity of its refractive index through a thickness of at least 50 micron.

17. A photonic crystal material as claimed in claim 13, wherein the material has 3-D periodicity of its refractive index through a thickness of at least 10 micron.

18. A photonic crystal material as claimed in claim 17, wherein the material has 3-D periodicity of its refractive index through a thickness of at least 50 micron.

19. A photonic crystal material as claimed in claim 12, wherein the material has 3-D periodicity of its refractive index through a thickness of at least 10 micron.

20. A photonic crystal material as claimed in claim 19, wherein the material has 3-D periodicity of its refractive index through a thickness of at least 50 micron.

* * * * *